(12) United States Patent
Wiklund et al.

(10) Patent No.: US 6,817,252 B2
(45) Date of Patent: Nov. 16, 2004

(54) PISTON POSITION MEASURING DEVICE

(75) Inventors: David E. Wiklund, Eden Prairie, MN (US); Terrance F. Krouth, Eden Prairie, MN (US); Richard J. Habegger, Wolcottville, IN (US); Richard R. Hineman, Gunterville, AL (US)

(73) Assignee: Rosemount Inc., Eden Prairie, MN (US)

( * ) Notice: Subject to any disclaimer, the term of this patent is extended or adjusted under 35 U.S.C. 154(b) by 20 days.

(21) Appl. No.: 10/317,981

(22) Filed: Dec. 12, 2002

(65) Prior Publication Data

US 2003/0084719 A1 May 8, 2003

Related U.S. Application Data

(63) Continuation of application No. 09/521,132, filed on Mar. 8, 2000, now abandoned.

(51) Int. Cl.[7] ............................................... G01F 1/34
(52) U.S. Cl. ................................................. 73/861.44
(58) Field of Search ........................ 73/861.42, 861.44, 73/861.45, 861.46, 861.47

(56) References Cited

U.S. PATENT DOCUMENTS

| | | |
|---|---|---|
| 1,480,661 A | 1/1924 | Brown |
| 1,698,314 A | 1/1929 | Mapelsden |
| 2,943,640 A | 7/1960 | James ........................ 137/594 |
| 3,160,836 A | 12/1964 | Farley .......................... 336/30 |
| 3,388,597 A | 6/1968 | Bargen et al. ................ 73/398 |
| 3,430,489 A | 3/1969 | Pfrehm ......................... 73/231 |
| 3,494,190 A | 2/1970 | Schwartzman ............... 73/228 |
| 3,561,831 A | 2/1971 | Alibert et al. ................ 310/8.7 |
| 3,657,925 A | 4/1972 | Gross ........................... 73/239 |
| 3,678,754 A | 7/1972 | Amir et al. ................... 73/419 |
| 3,727,520 A | 4/1973 | McKown et al. ............. 91/433 |
| 3,817,283 A | 6/1974 | Hewson |
| 3,958,492 A | 5/1976 | Curless ...................... 91/363 R |
| 3,970,034 A | 7/1976 | Kirk ........................... 116/124 |
| 4,031,813 A | 6/1977 | Walters et al. ................ 91/433 |
| 4,100,798 A | 7/1978 | Nilsson et al. ............ 73/194 E |
| 4,126,047 A | 11/1978 | Sethares et al. .............. 73/505 |
| 4,193,420 A | 3/1980 | Hewson ...................... 137/356 |
| 4,205,592 A | 6/1980 | Haüssler ...................... 91/449 |
| 4,249,164 A | 2/1981 | Tivy ........................ 340/870.3 |
| 4,275,793 A | 6/1981 | Schivley, Jr. et al. ........... 173/9 |
| 4,281,584 A * | 8/1981 | Onken et al. ..................... 91/1 |
| 4,304,136 A | 12/1981 | McCabe et al. ......... 73/861.54 |

(List continued on next page.)

FOREIGN PATENT DOCUMENTS

| | | |
|---|---|---|
| DE | 31 16333 A1 | 4/1981 |
| DE | 3244668 | 6/1984 |
| DE | 4220333 | 12/1993 |

(List continued on next page.)

OTHER PUBLICATIONS

Nishimoto T. et al., article entitled "Buried Piezoresistive sensors by means o MeV ion implantation", *Sensors and Actuators*, May 1994, vol. A43, No. 1/3, p. 249–253.

(List continued on next page.)

*Primary Examiner*—Max Noori
(74) *Attorney, Agent, or Firm*—Westman, Champlin & Kelly

(57) ABSTRACT

A measuring device is provided for determining a position of a piston contained within a hydraulic actuator as a function of a hydraulic fluid flow. The measuring device includes a bi-directional flow sensor positioned inline with the hydraulic fluid flow and a piston position module. The flow sensor is configured to produce a flow rate signal that is indicative flow rate of the hydraulic fluid flow into and out of a first cavity. The piston position module is configured to receive the flow rate signal from the flow sensor and produce a piston position signal that is indicative of the position of the piston within the hydraulic actuator as a function of the flow rate signal.

21 Claims, 4 Drawing Sheets

U.S. PATENT DOCUMENTS

| | | | | |
|---|---|---|---|---|
| 4,319,492 A | | 3/1982 | Hewson et al. | 73/756 |
| 4,381,699 A | | 5/1983 | Haussler | 91/433 |
| 4,424,716 A | | 1/1984 | Boehringer et al. | 73/861.56 |
| 4,436,348 A | * | 3/1984 | Farr | 303/115 |
| 4,466,290 A | | 8/1984 | Frick | 73/756 |
| 4,520,660 A | | 6/1985 | Hitchcock | 73/120 |
| 4,539,837 A | | 9/1985 | Barnaby | 73/55 |
| 4,539,967 A | | 9/1985 | Nakajima et al. | 123/585 |
| 4,543,649 A | | 9/1985 | Head et al. | 367/96 |
| 4,545,406 A | | 10/1985 | King | 137/553 |
| 4,557,296 A | | 12/1985 | Byrne | 138/44 |
| 4,584,472 A | | 4/1986 | Wiblin et al. | 250/237 G |
| 4,585,021 A | * | 4/1986 | Belknap | 137/100 |
| 4,588,953 A | | 5/1986 | Krage | 324/58.5 C |
| 4,627,196 A | * | 12/1986 | Veale | 451/28 |
| 4,631,478 A | | 12/1986 | Knetsch et al. | 324/207 |
| 4,671,166 A | | 6/1987 | Glaze et al. | 91/361 |
| 4,689,553 A | | 8/1987 | Haddox | 324/58.5 C |
| 4,737,705 A | | 4/1988 | Bitar et al. | 324/58.5 C |
| 4,742,794 A | | 5/1988 | Hagstrom | 114/286 |
| 4,744,218 A | | 5/1988 | Edwards et al. | 60/368 |
| 4,745,810 A | | 5/1988 | Pierce et al. | 73/706 |
| 4,749,936 A | | 6/1988 | Taplin | 324/58.5 B |
| 4,751,501 A | | 6/1988 | Gut | 340/607 |
| 4,757,745 A | | 7/1988 | Taplin | 91/361 |
| 4,774,465 A | | 9/1988 | Nilius | 324/208 |
| 4,841,776 A | | 6/1989 | Kawachi et al. | 73/706 |
| 4,866,269 A | | 9/1989 | Wlodarczyk et al. | 250/231 |
| 4,901,628 A | | 2/1990 | Krage | 92/5 R |
| 4,932,269 A | | 6/1990 | Cammarata, III et al. | 73/861.61 |
| 4,938,054 A | | 7/1990 | Dye et al. | 73/3 |
| 4,947,732 A | | 8/1990 | Hidenobu | 91/363 |
| 4,961,055 A | | 10/1990 | Habib et al. | 324/662 |
| 4,987,823 A | | 1/1991 | Taplin et al. | 91/361 |
| 5,000,650 A | | 3/1991 | Brewer et al. | 414/699 |
| 5,031,506 A | | 7/1991 | Baisch et al. | 91/363 R |
| 5,036,711 A | | 8/1991 | Good | 73/861.66 |
| 5,072,198 A | | 12/1991 | Taplin et al. | 333/33 |
| 5,085,250 A | | 2/1992 | Kendrick | 138/44 |
| 5,104,144 A | | 4/1992 | Bethell | 280/707 |
| 5,150,049 A | | 9/1992 | Schuetz | 324/207.12 |
| 5,150,060 A | | 9/1992 | Bitar | 324/635 |
| 5,182,979 A | | 2/1993 | Morgan | 92/5 R |
| 5,182,980 A | | 2/1993 | Greer | 92/5 R |
| 5,218,820 A | | 6/1993 | Sepehri et al. | 60/463 |
| 5,218,895 A | | 6/1993 | Lukich et al. | 91/361 |
| 5,233,293 A | | 8/1993 | Huang et al. | 324/207.15 |
| 5,241,278 A | | 8/1993 | Bitar | 324/635 |
| 5,247,172 A | | 9/1993 | Riemer | 250/227.21 |
| 5,260,665 A | | 11/1993 | Goldberg et al. | 324/636 |
| 5,274,271 A | | 12/1993 | McEwan | 307/108 |
| 5,313,871 A | | 5/1994 | Kaneko et al. | 91/361 |
| 5,325,063 A | | 6/1994 | Morgan | 324/636 |
| 5,332,938 A | | 7/1994 | McEwan | 307/572 |
| 5,345,471 A | | 9/1994 | McEwan | 375/1 |
| 5,361,070 A | | 11/1994 | McEwan | 342/387 |
| 5,365,795 A | | 11/1994 | Brower, Jr. | 73/861.65 |
| 5,422,607 A | | 6/1995 | McEwan | 333/20 |
| 5,424,941 A | | 6/1995 | Bolt et al. | 364/148 |
| 5,438,261 A | | 8/1995 | Codina et al. | 324/207.16 |
| 5,438,274 A | | 8/1995 | Bitar et al. | 324/636 |
| 5,455,769 A | | 10/1995 | Panoushek et al. | 364/424.07 |
| 5,457,394 A | | 10/1995 | McEwan | 324/642 |
| 5,457,960 A | | 10/1995 | Morishita | 91/361 |
| 5,461,368 A | | 10/1995 | Comer | 340/607 |
| 5,465,094 A | | 11/1995 | McEwan | 342/28 |
| 5,469,749 A | | 11/1995 | Shimada et al. | 73/861.47 |
| 5,471,147 A | | 11/1995 | Allen et al. | 324/635 |
| 5,471,162 A | | 11/1995 | McEwan | 327/92 |
| 5,479,120 A | | 12/1995 | McEwan | 327/91 |
| 5,491,422 A | | 2/1996 | Bitar et al. | 324/636 |
| 5,510,800 A | | 4/1996 | McEwan | 342/387 |
| 5,512,834 A | | 4/1996 | McEwan | 324/642 |
| 5,517,198 A | | 5/1996 | McEwan | 342/89 |
| 5,519,342 A | | 5/1996 | McEwan | 327/94 |
| 5,519,400 A | | 5/1996 | McEwan | 342/28 |
| 5,521,600 A | | 5/1996 | McEwan | 342/27 |
| 5,523,760 A | | 6/1996 | McEwan | 342/89 |
| 5,535,587 A | | 7/1996 | Tanaka et al. | 60/427 |
| 5,536,536 A | | 7/1996 | Kelley | 427/386 |
| 5,540,137 A | | 7/1996 | Lark et al. | 92/5 R |
| 5,563,605 A | | 10/1996 | McEwan | 342/202 |
| 5,573,012 A | | 11/1996 | McEwan | 128/782 |
| 5,576,498 A | | 11/1996 | Shambayati | 73/861.52 |
| 5,576,627 A | | 11/1996 | McEwan | 324/639 |
| 5,581,256 A | | 12/1996 | McEwan | 342/37 |
| 5,587,536 A | | 12/1996 | Rasmussen | 73/744 |
| 5,589,838 A | | 12/1996 | McEwan | 342/387 |
| 5,602,372 A | | 2/1997 | Strelow | 200/81.9 R |
| 5,609,059 A | | 3/1997 | McEwan | 73/290 R |
| 5,617,034 A | | 4/1997 | Lark et al. | 324/635 |
| 5,661,277 A | | 8/1997 | Graham, II | 200/81.9 R |
| 5,710,514 A | | 1/1998 | Crayton et al. | 324/635 |
| 5,773,726 A | | 6/1998 | Mahoney et al. | 73/861.65 |
| 5,817,950 A | | 10/1998 | Wiklund et al. | 73/861.66 |
| 5,861,546 A | | 1/1999 | Sagi et al. | 73/40.5 |
| 5,879,544 A | * | 3/1999 | Cassidy | 210/90 |
| 5,901,633 A | | 5/1999 | Chan et al. | 92/5 R |
| 5,977,778 A | | 11/1999 | Chan et al. | 324/635 |
| 6,142,059 A | | 11/2000 | Chan et al. | 92/5 R |
| 6,158,967 A | | 12/2000 | Dupre | 41/53 |
| 6,269,641 B1 | | 8/2001 | Dean | 60/567 |
| 6,412,483 B1 | | 7/2002 | Jones et al. | 128/205.11 |
| 6,575,264 B2 | | 6/2003 | Spadafora | 180/422 |

FOREIGN PATENT DOCUMENTS

| | | |
|---|---|---|
| DE | G 94 17 204.8 | 10/1994 |
| DE | 0 686 831 A2 | 12/1995 |
| DE | 29616034 | 2/1997 |
| EP | 0154531 | 9/1985 |
| EP | 0 266 606 A2 | 10/1987 |
| EP | 0309643 | 4/1989 |
| EP | 0331772 | 9/1989 |
| EP | 0 887 626 A1 | 6/1998 |
| FR | 2485724 | 12/1981 |
| GB | 1080852 | 8/1967 |
| GB | 1467957 | 3/1977 |
| GB | 2011997 | 7/1979 |
| GB | 2155635 | 9/1985 |
| GB | 2 172 995 A | 10/1986 |
| GB | 2259147 | 3/1993 |
| GB | 2 301 676 | 12/1996 |
| JP | 0168106 | 10/1982 |
| JP | 57-198823 | 12/1982 |
| JP | 6160605 | 7/1986 |
| JP | 63070121 | 3/1988 |
| JP | 01207634 | 11/1989 |
| JP | 04-225126 | 8/1992 |
| JP | 0168107 | 10/1992 |
| JP | 06-213694 | 1/1994 |
| WO | WO 96/24028 | 8/1996 |
| WO | WO 98/23867 | 6/1998 |

OTHER PUBLICATIONS

U.S. patent application Ser. No. 09/395,688, Kleven, filed Sep. 13, 1999.

U.S. patent application Ser. No. 09/394,728, Kleven, filed Sep. 13, 1999.

Process Instrument Engineers Handbook, Revised Edition, Chapters 2.10, 2.11, and 2.12, pp. 87–110 (1982).

Model 8800A Vortex Flowmeter, Key Differentiators (undated).

Model 1195 Integral Orifice Assembly, Rosemount Catalog pp. Flow–125–Flow 137 (Published 1995).

Model 8800 Smart Vortex Flowmeter, Fisher–Rosemount, Managing the Process Better, pp. 2–19, (1994).

Model 8800A Smart Vortex Flowmeter, Fisher–Rosemount, Managing the Process Better, pp. 2–21 (1997).

On–Line Catalog Level and Flow Instrumentation—Flow Gauges, Industrial Process Measurement, Inc., re: RCM Industries, Inc. products, 6 pages.

Kobold, re: RCM Industries, Inc. products, pp. 13–18.

"A Physicist's Desk Reference", *American Institute of Physics*, New York, 1992, p. 201.

"Handbook of Chemistry and Physics", CRC Press, Ohio, 1975, p. E–223.

"The Electrical Engineering Handbook", Editor–in–Chief, R. Dorf, CRC Press, 1997, pp. 811–812.

Brochure: Technik, "Absolute Position Measurement Using Conducive Plastic Potentiometers".

Brochure: Penny + Giles "Technology Leaders in Displacement Monitoring & Manual Control".

Brochure: DC Hydrostar, "Position Transducer".

"An LVDT Primer", *SENSORS*, Jun. 1996, pp. 27–30.

"Understanding Magnetostrictive LDTs", W.D. Peterson, *Hydraulics & Pneumatics*, Feb. 1993, pp. 32–34.

Brochure: Penny + Giles Product Data, "Cylinder Transducer Model HLP100".

Magazine: "Not Just a Blip on the Screen", *Business Week*, Feb. 19, 1996, pp. 64–65.

International Search Report from International Application No. PCT/US 02/15311, filed May 15, 2002. Date of report Aug. 5, 2002.

U.S. patent application No. 09/521,132, entitled "Piston Position Measuring Device," Filed Mar. 8, 2000.

U.S. Provisional Application No. 60/218,329, entitled "Hydraulic Valve Body with Differential Pressure Flow Measurement," filed Jul. 14, 2000.

U.S. patent application No. 90/521,537, entitled "Bi–Directional Differential Pressure Flow Sensor," filed Mar. 8, 2000.

U.S. Provisional Application No. 60/187,849, entitled "System for Controlling Multiple Hydraulic Cylinders," filed Mar. 8, 2000.

Office Communication for Application No. 10/318,247, filed Dec. 12, 2002. Date mailed Mar. 18, 2004.

\* cited by examiner

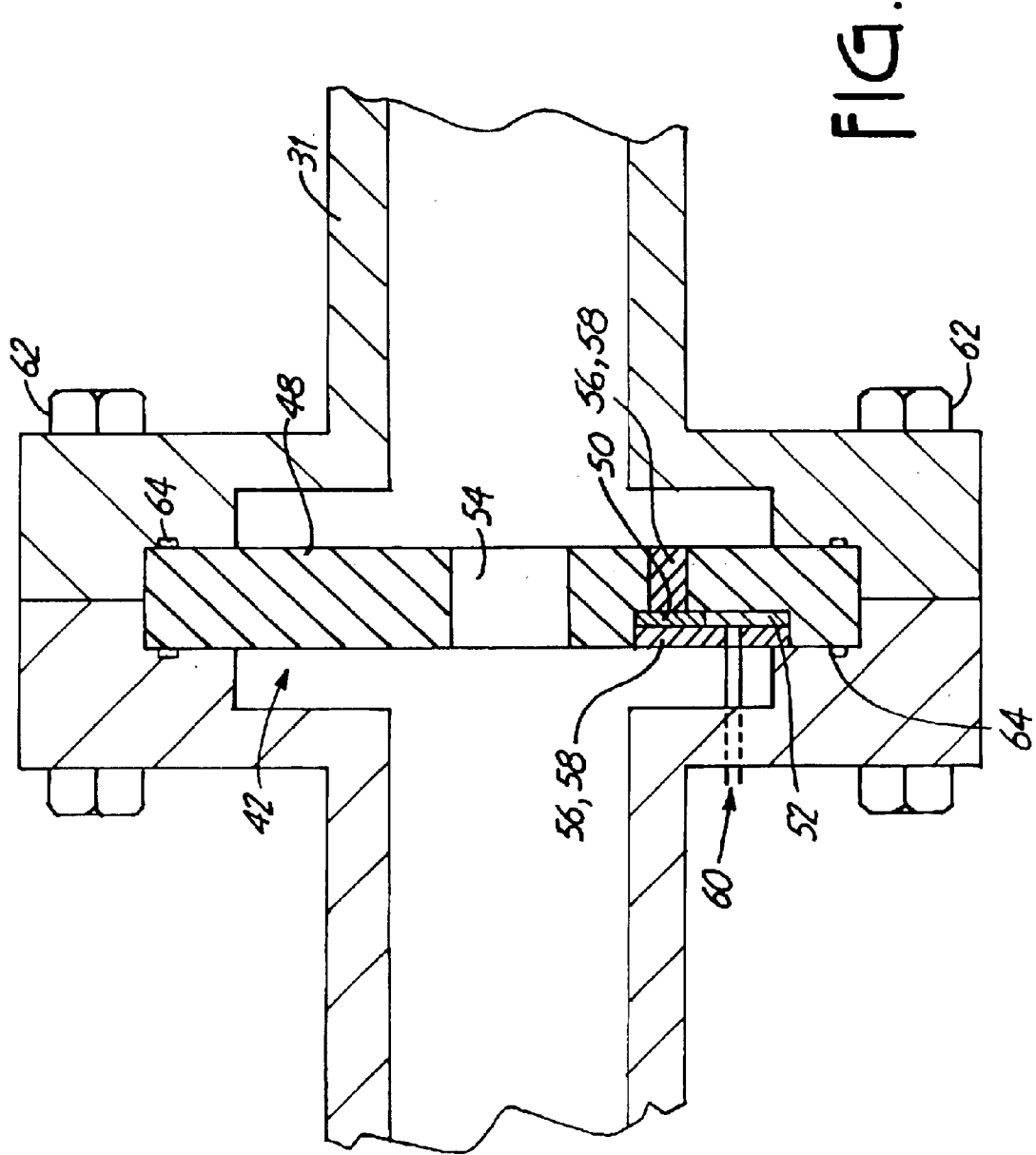

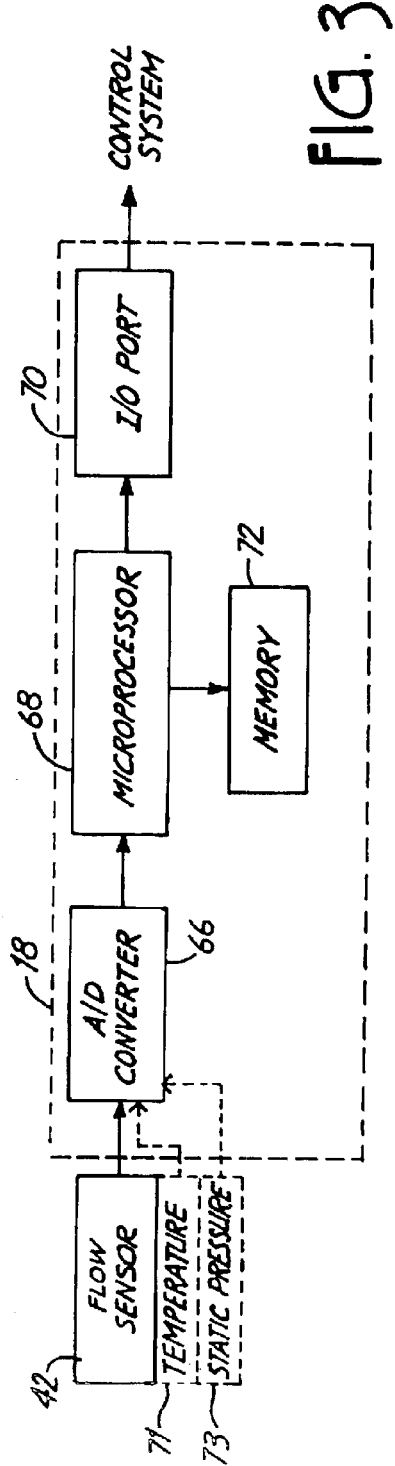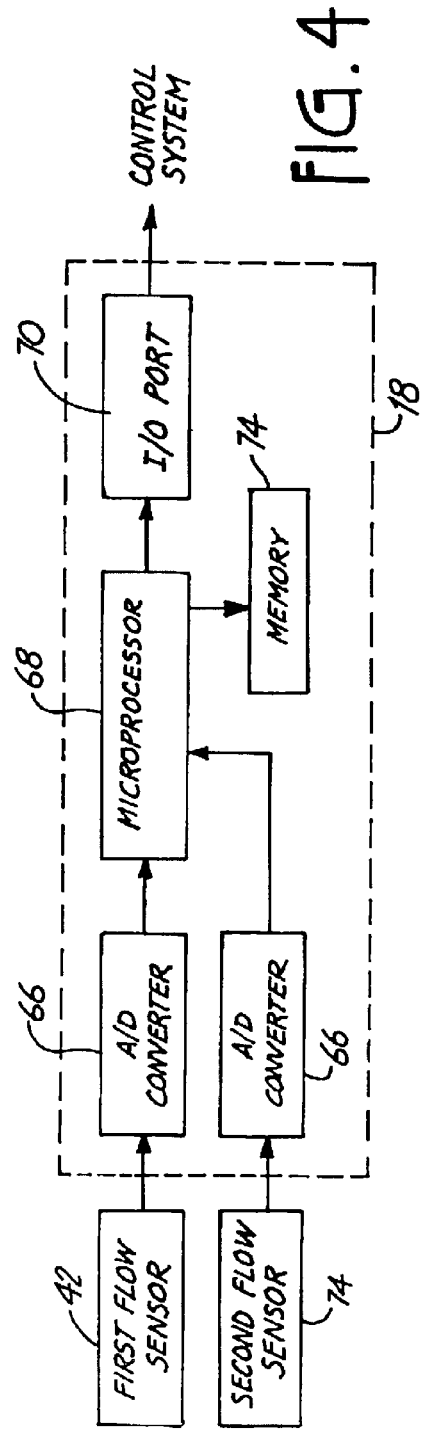

PISTON POSITION MEASURING DEVICE

CROSS REFERENCE TO RELATED APPLICATION

This is a continuation of U.S. patent application Ser. No. 09/521,132, filed Mar. 8, 2000, now abandoned and entitled "PISTON POSITION MEASURING DEVICE," the content of which is hereby incorporated by reference in its entirety.

BACKGROUND OF THE INVENTION

The present invention relates to hydraulic systems, more particularly, the present invention relates to measuring the position of a piston in a hydraulic cylinder.

Hydraulic cylinder, piston and rod combinations, or hydraulic actuators, are used in a wide variety of industries ranging from road construction to sanitation process control. For many applications, it would be useful to know the piston position. By knowing the piston position, the location or orientation of the object being actuated by hydraulic actuators can be determined. Thus, for example, the position of a blade of a road grading machine that is actuated by one or more hydraulic actuators can be determined as a function of the piston positions of the hydraulic actuators. Furthermore, knowledge of the piston position would allow a control system to control the piston position. For example, a blade of a road grading machine could be repeatedly positioned as desired resulting in more precise grading. Other process applications include hydraulic cylinders used to move agitators or equipment used with tanks, hoppers or other components of processing plants.

One technique of determining the piston position is described in U.S. Pat. No. 4,588,953 which correlates resonances of electromagnetic waves in a cavity formed between the closed end of the hydraulic cylinder and the piston with the position of the piston within the hydraulic cylinder. Another technique uses sensors positioned within the hydraulic cylinder to sense the position of the piston. Still another technique involves attaching a cord carried on a spool to the piston where the rotation of the spool relates to piston position. However, there is an ongoing need for accurate, repeatable and reliable piston position measurement.

SUMMARY OF THE INVENTION

A measuring device is provided for determining a position of a piston contained within a hydraulic actuator as a function of a hydraulic fluid flow. The measuring device includes a bi-directional flow sensor positioned inline with the hydraulic fluid flow and a piston position module. The flow sensor is configured to produce a flow rate signal that is indicative of the direction and flow rate of the hydraulic fluid flow into a first cavity. The piston position module is configured to receive the flow rate signal from the flow sensor and produce a piston position signal as a function of the flow rate signal.

BRIEF DESCRIPTION OF THE DRAWINGS

FIG. 2 shows a flow sensor in accordance with an embodiment of the invention.

FIGS. 3 and 4 show simplified block diagrams of a measuring device in accordance with one embodiment of the present invention.

DETAILED DESCRIPTION OF THE PREFERRED EMBODIMENTS

Figure 1:
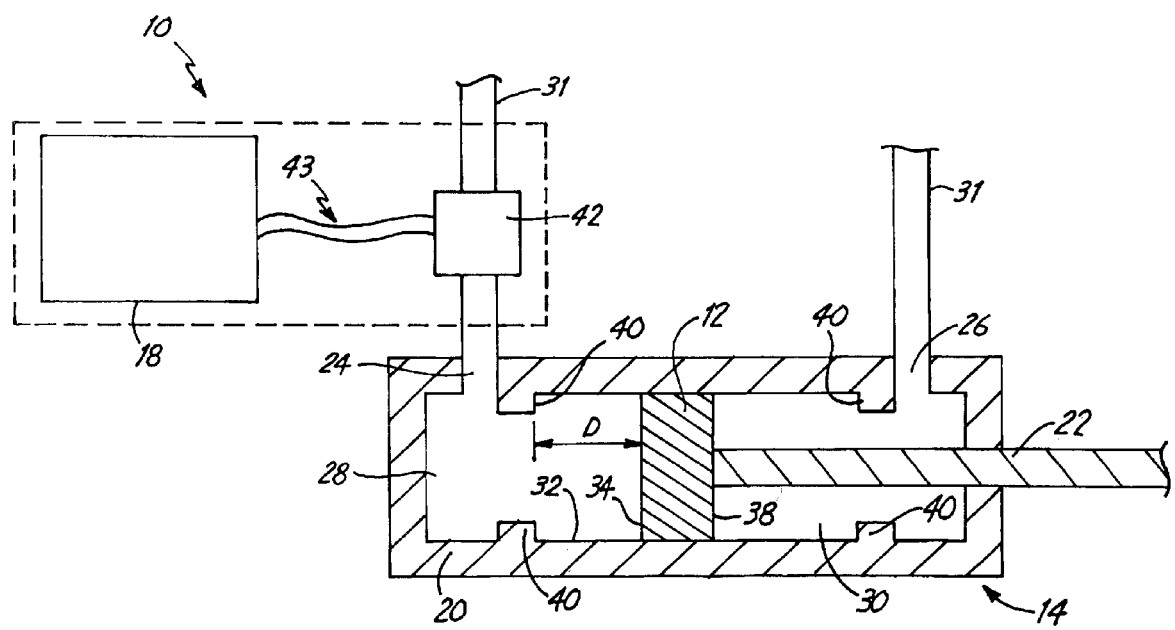
FIG. 1 shows a simplified block diagram of one embodiment of the present invention attached to an example of a hydraulic actuator.

FIG. 1 shows measuring device 10, which, in accordance with the present invention, determines a position of piston 12 of hydraulic actuator 14 as a function of a hydraulic fluid flow. Measuring device 10 generally includes bi-directional flow sensor 42 and piston position module 18. Flow sensor 42 produces a flow rate signal that is indicative of the flow rate of the hydraulic fluid flow and, piston position module 18 determines the position of piston 12 as a function of the flow rate signal.

Hydraulic actuator 14 generally includes hydraulic cylinder 20, rod 22, and piston 12. Piston 12 is attached to rod 22 and is slidably contained within hydraulic cylinder 20. Hydraulic cylinder 20 includes first and second ports 24, 26 which are adapted to direct a hydraulic fluid flow into and out of first and second cavities 28, 30, respectively, through conduit 31. First cavity 28 is defined by interior wall 32 of hydraulic cylinder 20 and surface 34 of piston 12. Second cavity 30 is defined by interior wall 32 of hydraulic cylinder 20 and surface 38 of piston 12. First and second cavities 28, 30 are completely filled with hydraulic fluid and the position of piston 12 is directly related to the volume of first and second cavities 28, 30, and thus, the volume of hydraulic fluid contained in first and second cavities 28, 30. Piston stops 40 limit the range of motion of piston 12.

In one embodiment of measuring device 10, flow sensor 42 is a bi-directional flow sensor which produces a flow rate signal that is indicative of the volumetric flow rate $Q_v$ of the hydraulic fluid flow and the direction of the hydraulic fluid flow. The direction of the hydraulic fluid flow being either into and out of first or second cavity 28, 30, depending on the location of flow sensor 42. In the embodiment shown in FIG. 1, flow sensor 42 is positioned inline with conduit 31 which is coupled to first port 24 of hydraulic cylinder 20. Thus, flow sensor 42 will produce a flow rate signal that is indicative of the volumetric flow rate of the hydraulic fluid flow into and out of first cavity 28. Alternatively, flow sensor 42 could be positioned inline with the hydraulic fluid flow directed toward second port 26 to produce a flow rate signal that is indicative of the volumetric flow rate of the hydraulic fluid into and out of second cavity 30. Piston position module 18 is configured to receive the flow rate signal from flow sensor 42 over a suitable electronic connection, such as wires 43, and determine the position of piston 12 as a function of the flow rate signal.

The position of piston 12 depends on the volumetric flow rate $Q_v$ of the hydraulic fluid flow into the first and second cavities 28, 30. When the hydraulic fluid flow is directed into first cavity 28 through first port 24, piston 12 is forced to slide toward second cavity 30 and hydraulic fluid is expelled out second port 26. Similarly, when the hydraulic fluid flow is directed into second cavity 30 through second port 26, piston 12 is forced to slide toward first cavity 28 and hydraulic fluid is expelled out first port 24. The distance D piston 12 travels, when hydraulic fluid is pumped into first cavity 28, is directly related to either the volume of hydraulic fluid pumped into first cavity 28 or that expelled from second cavity 30, and thus, either the change in volume $\Delta V_1$ of first cavity 28 or the change in volume $\Delta V_2$ of second cavity 30. This relationship is shown in following equations:

$$\Delta V_1 = A_1 \times D = \int Q_{v1} \qquad \text{Eq. 1}$$

$$\Delta V_2 = A_2 \times D = \int Q_{v2} \qquad \text{Eq. 2}$$

where:
- $A_1$=the cross sectional area of first cavity 28
- $A_2$=the cross sectional area of second cavity 30 less the cross sectional area of rod 22
- $Q_{v1}$=the volumetric flow rate of hydraulic fluid into first cavity 28
- $Q_{v2}$=the volumetric flow rate of hydraulic fluid into second cavity 30

Thus, the equations for the distance D are as follows:

$$D = \frac{\Delta V_1}{A_1} = \frac{1}{A_1}\int Q_{v1} \qquad \text{Eq. 3}$$

$$D = \frac{\Delta V_2}{A_2} = \frac{1}{A_2}\int Q_{v2} \qquad \text{Eq. 4}$$

As a result, piston position module 18 can establish the distance D that piston 12 moves by integrating the flow rate signal received from flow sensor 42 and dividing by the corresponding cross-sectional area of the applicable cavity, as indicated in Eqs. 3 and 4. The position of piston 12 can be established by piston position module 18 by measuring the distance D from a reference position for piston 12. Piston position module 18 can maintain the change in volume $\Delta V_1$ or $\Delta V_2$ of first or second cavity 28, 30, respectively, as measured with respect to the reference position of piston 12, to provide the position of piston 12 with respect to the reference position. The reference position could be anywhere along hydraulic cylinder 30 including the middle of hydraulic cylinder 30 or at either of the ends of the range of motion of piston 12 defined by stops 40. Limit switches could be coupled to piston 12 or within hydraulic cylinder 20, such as at stops 40, to provide a signal to piston position module 18 for establishing the reference or zero position for piston 12.

One embodiment of flow sensor 42 is an integral differential pressure flow sensor 42, shown installed inline with conduit 31 in FIG. 2. Flow sensor 42 is adapted to produce a discontinuity within the hydraulic fluid flow in conduit 31 and measure a pressure drop across the discontinuity, from which the direction and flow rate of the hydraulic fluid flow can be determined. Flow sensor 42 generally includes flow restriction member 48, differential pressure sensor 50, and processing electronics 52. Flow sensor 42 can be installed in conduit 31 using nuts and bolts 62. O-rings 64 can be used to seal the installation.

Flow restriction member 48, shown as an orifice plate having an orifice 54, produces the discontinuity in conduit 31 by restricting the hydraulic fluid flow therethrough. In general, flow restriction member 48 is configured to operate in bi-directional fluid flows. Those skilled in the art will appreciate that other configurations of flow restriction member 48 that can produce the desired pressure drop could be substituted for the depicted flow restriction member 48. These include, for example, orifice plates having concentric and eccentric orifices, plates without orifices, wedge elements consisting of two non-parallel faces which form an apex, or other commonly used bi-directional flow restriction members.

Differential pressure sensor 50 is adapted to produce a differential pressure signal that is indicative of the pressure drop. Differential pressure sensor 50 can comprise two separate absolute or gauge pressure sensors arranged on opposite sides of member 48 such that a differential pressure signal is related to a difference between the outputs from the two sensors. Differential pressure sensor 50 can be a piezoresistive pressure sensor that couples to the pressure drop across flow restriction member 31 by way of openings 56. One of the advantages of this type of differential pressure sensor is that it does not require the use of isolation diaphragms and fill fluid to isolation from the hydraulic fluid. A coating 58 can be adapted to isolate protect differential pressure sensor 50 without affecting the sensitivity of differential pressure sensor to the pressure drop. Differential pressure sensor 50 could also be a capacitance-based differential pressure sensor or other type of sensor that is known in the art.

Processing electronics 52 is adapted to receive the differential pressure signal from differential pressure sensor 50 and produce a flow rate signal that is indicative of the direction and flow rate of the hydraulic fluid flow in conduit 31 as a function of the differential pressure signal. The flow rate signal can be transferred to piston position module 18 of measuring device 10 through terminals 60. Further, measured process variables (differential pressure, static pressure or temperature) can also be sent to module 18.

Additionally, flow sensor 42 can include temperature sensor 71 and static pressure sensor 73 depicted in FIG. 3. Temperature sensor 71 can be adapted to measure the temperature of the hydraulic fluid flow and/or the operating temperature of differential pressure sensor 50. Temperature sensor 71 can produce a temperature signal that is indicative of the sensed temperature, that can be used by processing electronics 52 in the calculation of the flow rate. Temperature sensor 71 can be integral with or embedded in restriction member 48. If a piezoresistive pressure sensor is used, a bridge resistance of the sensor can provide an output related to temperature. Static pressure measurements from static pressure sensor 73 can be used to correct for compressibility effects in the oil.

Examples of a suitable bi-directional differential pressure flow sensor 42 is described in co-pending U.S. patent application Ser. No. 10/289,149 entitled BI-DIRECTIONAL DIFFERENTIAL PRESSURE FLOW SENSOR, which is incorporated herein by reference.

Referring now to FIG. 3, piston position module 18 generally includes analog to digital (A/D) converter 66, microprocessor 68, input/output (I/O) port 70, and memory 72. The optional temperature sensor 71 and static pressure sensor 73 can be provided to module 18 to correct for flow variations due to the temperature and the static pressure of the hydraulic fluid, as mentioned above. Piston position module 18 receives the flow rate signal, in accordance with an analog communication protocol, at A/D converter 66 which digitizes the flow rate signal. The analog signal can be a standard 4–20 mA analog signal that is delivered over wires 43. Alternatively, A/D converter 66 can be eliminated from piston position module 18 and microprocessor 68 can receive the flow rate signal directly from flow sensor 42 when the flow rate signal is a digitized flow rate signal that is provided in accordance with a digital communication protocol. Suitable digital communication protocols include, for example, Highway Addressable Remote Transducer (HART®), FOUNDATION™ Fieldbus, Profibus PA, Profibus DP, Device Net, Controller Area Network (CAN), Asi, and other digital communication protocols commonly used in the industry.

Microprocessor 68 uses the digitized flow rate signal, which is received from either A/D converter 66 or flow sensor 42, to determine the position of piston 12 within hydraulic cylinder 20. Memory 72 can be used to store various information, such as the current position of piston 12, an account of the volume of first and second cavities 28, 30 or the volume of hydraulic fluid contained therein, the current changes in volumes $\Delta V_1$ and $\Delta V_2$, areas $A_1$ and $A_2$ which could be a function of the position of piston 12, and any other information that could be useful to piston position module 18. Microprocessor 68 produces a position signal that is indicative of the position of piston 12 within hydraulic cylinder 20 which can be received by a control system through I/O port 70. Module 18 can also receive differential pressure, static pressure and temperature signals from flow sensor 42. Microprocessor 68 can use the differential pressure signal to compensate for any spikes or anomalies in the flow rate signal which can occur when the piston starts or stops.

FIG. 4 shows another embodiment of measuring device 10, in which a second flow sensor 74 is included so that the hydraulic fluid flows coupled to first and second cavities 28, 30 can each be measured. Microprocessor 68 of piston position module 18 can receive the flow rate signals from flow sensor 42 (first flow sensor) and second flow sensor 74 through A/D converters 58 and determine the position of piston 12 as describe above using each of the flow rate signals. As a result, piston position module 18 can calculate both changes in volumes $\Delta V_1$ and $\Delta V_2$. In one embodiment, piston position module 18 compares the changes in volumes $\Delta V_1$ and $\Delta V_2$ to determine whether an error has occurred. Additionally, such a comparison can also be useful for diagnostic purposes, such as for detecting leaks in the hydraulic system. Since the distance D is the same in Eqs. 1 and 2 the comparison can be made using Eq. 5 below:

$$\Delta V_1 = \Delta V_2 \times \frac{A_1}{A_2} = \Delta V_2 \times A^* \qquad \text{Eq. 5}$$

where $A^*$ is equal to the ratio of $A_1$ to $A_2$. This may be useful, for example, when piston 12 changes direction or contacts stops 40.

In another embodiment, piston position module 18 selects a different change in volume $\Delta V_1$ or $\Delta V_2$ on which to base the calculations of the position of piston 12, due to anomalies which may be present in the system. For example, it may be desirable to use change in volume $\Delta V_1$ when piston 12 is positioned closer to second port 26 than first port 24, and change in volume $\Delta V_2$ when piston 12 is closer to first port 24 than second port 26.

Figure 5:
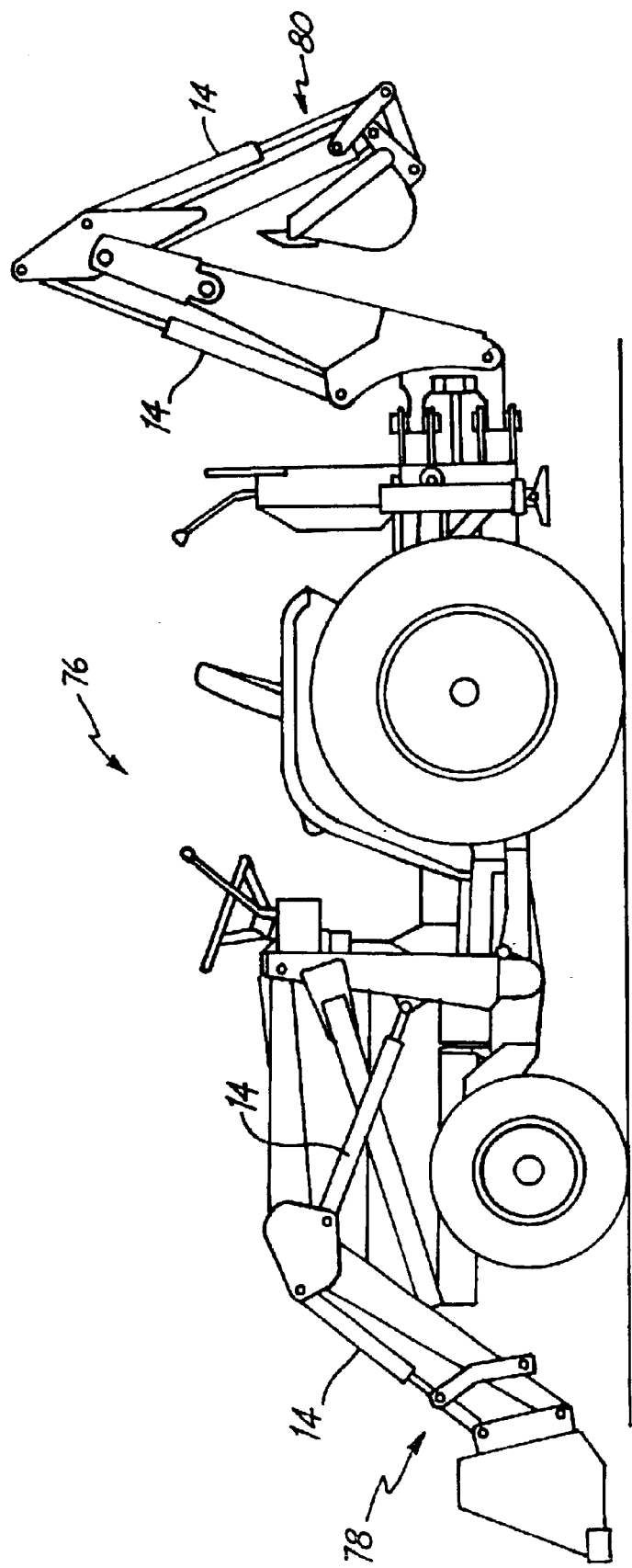
FIG. 5 shows a tractor having hydraulic actuators which have pistons whose position could be monitored by the present invention.

FIG. 5 shows a tractor 76, which is one example of an application where embodiments of the present invention could be used. Tractor 76 contains several hydraulic actuators 14 that are used to control the position and operation of front loader 78 and backhoe 80. Measuring device 10 of the present invention can determine the position of the pistons within hydraulic actuators 14 that are used to actuate front loader 78 and backhoe 80. As a result, the present invention can be used to determine the positions of front loader 78 and backhoe 80 based upon the piston position information generated by the measuring device. Furthermore, measuring device 10 can produce a piston position signal that can be used by a control system to control the operation of front loader 78 and backhoe 80. The control system could use the piston position signal to implement programs which define specific movements of front loader 78 and backhoe 80.

It will be appreciated by one skilled in the art that the invention is not limited or restricted to the described actuator, but can also be used with other types of hydraulic actuators. For example, hydraulic actuators can have different configurations such as having only a single fluid port which directs a hydraulic fluid flow into and out of a single cavity which determines piston position. The present invention can still be used to calculate the position of the piston within these types of actuators by monitoring the volume of hydraulic fluid that flows in and out of the single cavity using the methods described above.

Although the present invention has been described with reference to preferred embodiments, workers skilled in the art will recognize that changes may be made in form and detail without departing from the spirit and scope of the invention.

What is claimed is:

1. A device for measuring a position of a piston slidably contained within a hydraulic cylinder of a hydraulic actuator, the piston and the hydraulic cylinder define a first cavity that receives a hydraulic fluid flow, the device comprising:

a bi-directional flow sensor positioned inline with the hydraulic fluid flow and having a flow rate signal output that is indicative of a flow rate of the hydraulic fluid into and out of the first cavity and is based on differential pressure; and a piston position module adapted to receive the flow rate signal output and responsively provide a piston position signal output related to the piston position within the hydraulic cylinder as a function of the flow rate signal output.

2. The device of claim 1, wherein the bi-directional flow sensor includes:

a bi-directional flow restriction member adapted to produce a pressure drop;

a differential pressure sensor embedded in the flow restriction member and adapted to produce a differential pressure signal that is indicative of the pressure drop; and processing electronics adapted receive the differential pressure signal and to produce the flow rate signal output as a function of the differential pressure signal.

3. The device of claim 1, wherein the flow rate signal output is in accordance with one of an analog communication protocol and a digital communication protocol.

4. The device of claim 1, wherein the piston position module includes:

an analog to digital converter electrically coupled to the flow sensor and adapted to receive the flow rate signal and convert the flow rate signal into a digitized flow rate signal; and a microprocessor electrically coupled to the analog to digital converter and adapted to receive the digitized flow rate signal output, calculate a volume of hydraulic fluid in the first cavity as a function of the digitized flow rate signal, and produce the piston position signal output as a function of the volume of hydraulic fluid in the first cavity.

5. The device of claim 4, wherein:

the device includes an input/output port electrically coupled to the microprocessor; and the microprocessor is further configured to provide the piston position signal output through the input/output port.

6. The device of claim 1, including a limit switch coupled to one of the hydraulic cylinder and the piston, wherein the piston position signal output is further a function of the limit switch.

7. The device of claim 1, wherein the bi-directional flow sensor is insensitive to position.

8. The device of claim 1, wherein the bi-directional pressure flow sensor includes a differential pressure sensor embedded in a flow restriction member.

9. The device of claim 1 includes a temperature sensor and wherein the piston position signal output is further a function of temperature.

10. The device of claim 1 wherein the piston position signal is a function of an integral of the flow rate signal.

11. The device of claim 1, wherein the flow sensor includes a differential pressure sensor having first and second pressure sensors having first and second pressure outputs, and wherein differential pressure is related to a difference between the first and second pressure sensor outputs.

12. A hydraulic actuator, comprising:
a hydraulic cylinder having first and second ports formed therein for receiving first and second hydraulic fluid flows therethrough, respectively;
a piston slidably received in the hydraulic cylinder, wherein the piston and the hydraulic cylinder define first and second cavities fluidically coupled to the first and second hydraulic fluid flows through the first and second ports respectively;
a first flow sensor positioned inline with the first hydraulic fluid flow and having a first flow rate signal output that is indicative of a flow rate of the first hydraulic fluid flow into and out of the first cavity and is based upon differential pressure; and
a piston position module adapted to receive the first flow rate signal and having a first piston position signal output, produced as function of the first flow rate signal, that is related to a first position of the piston within the hydraulic cylinder.

13. The hydraulic actuator of claim 12, wherein:
the apparatus includes a second flow sensor positioned inline with the second hydraulic fluid flow and having a second flow rate signal output that is indicative of a flow rate of the second hydraulic fluid flow into and out of the second cavity and is based upon differential pressure;
the piston position module is further configured to receive the second flow rate signal and having a second piston position signal output, produced as a function of the second flow rate signal, that is related to a second piston position within the hydraulic cylinder.

14. The hydraulic actuator of claim 13, wherein the piston position module is further configured to perform diagnostics using the first and second flow rate signal outputs.

15. The hydraulic actuator of claim 12 wherein the first flow sensor includes a differential pressure sensor comprising first and second pressure sensors having respective first and second pressure outputs, and wherein the differential pressure is a function of a difference between the first and second pressure outputs.

16. The device of claim 12 including a temperature sensor and wherein the flow rate signal is a function of a temperature.

17. The device of claim 12 wherein the first flow sensor includes a flow restriction member inline with the first hydraulic fluid flow and wherein the differential pressure is developed across the flow restriction member.

18. A method of measuring a position of a piston slidably contained within a hydraulic cylinder of a hydraulic actuator, the piston and the hydraulic cylinder define a first cavity, the method comprising:
measuring a differential pressure in a flow of hydraulic fluid into and out of the first cavity;
determining a flow rate of hydraulic fluid into the first cavity as a function of the differential pressure; and
calculating the position of the piston within the hydraulic cylinder as a function of the fluid flow rate.

19. The method of claim 18, further comprising:
producing a piston position signal that is indicative of the position of the piston within the hydraulic cylinder.

20. The method of claim 18, including measuring temperature of the hydraulic fluid, wherein piston position is further a function of the temperature.

21. The method of claim 18, wherein measuring differential pressure comprises subtracting a first measured static pressure from a second measured static pressure.

* * * * *